Jan. 19, 1943.   C. F. BEED   2,308,669
COMPOSITE CONTROL CABLE
Filed May 5, 1939
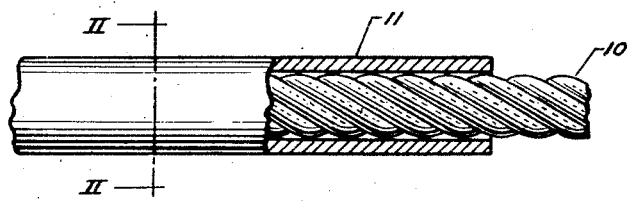 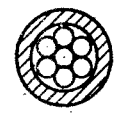
FIG. I   FIG. II
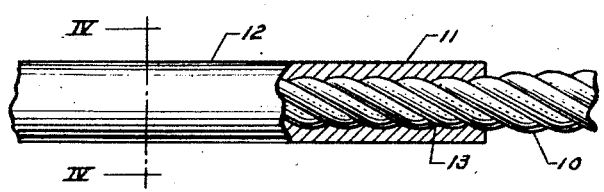 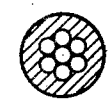
FIG. III   FIG. IV
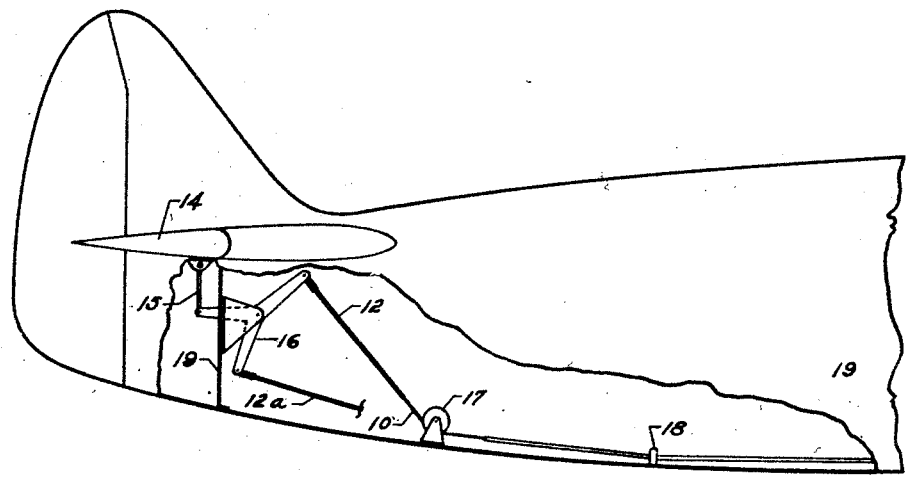
FIG. V
INVENTOR
Carl F. Beed

UNITED STATES PATENT OFFICE 2,308,669

COMPOSITE CONTROL CABLE

Carl F. Beed, Burbank, Calif., assignor to Lockheed Aircraft Corporation, Burbank, Calif., a corporation of California Application May 5, 1939, Serial No. 271,942

15 Claims. (Cl. 244—1)

The present invention relates to composite cables and more particularly to a means for modifying the effective coefficient of expansion of a flexible cable by swedging over the cable a tubular sheath of the desired characteristics. A composite cable thus formed is particularly advantageous in its application to aircraft.

I am well aware that it is old in the art to swedge a fitting upon a stranded cable either for the purpose of providing an attachment for the end of a cable or to make a splice at two abutting ends. However, it is obvious that these earlier inventors did not anticipate controlling the expansive properties of a stranded cable by swedging a sheath of dissimilar metal upon and coextensive with the length of the cable.

In present day aircraft having, for example, a main structure of aluminum alloy monocoque design, it is general practice to operate the various surface and engine controls by means of flexible steel cables. Since the safe operation of the airplane depends upon accurate and consistent adjustment of the controls, it is of utmost importance that uniform cable tension be maintained. It is a well known fact that slack in the cables operating the control surfaces, lowers the natural frequencies of said control surfaces and increases the possibility of flutter. Control flutter is a serious condition which often results in the destruction of the aircraft. If uniform cable tension is maintained, the natural frequencies of the control surfaces remain constant, and it is possible to compute the flutter conditions more accurately, thus insuring safer operation of the aircraft.

Due to the difference in the thermal coefficients of liner expansion of the aluminum alloy aircraft structure and the steel control cables, the operation of aircraft under varying temperature conditions results in the greater expansion or contraction of the aluminum alloy structure than that of the steel cables and thus produces considerable variation in cable rigging tension. This condition is more pronounced in large airplanes due to the increase in structure and cable lengths and, frequently, where the variation in temperature is great, causes excessive slack in the control cables at low temperatures which, as before mentioned, increases the possibility of flutter in the control surfaces.

The composite cables used in my research were made integral by swedging a tube of either aluminum or aluminum alloy over a flexible steel cable. However, other means for producing composite cables may be used with equal success. The composite cable thus formed has a coefficient of linear expansion which more nearly approaches that of aluminum alloy than does the coefficient of linear expansion of the steel cable alone, thus allowing a more uniform cable tension at all temperatures.

Another advantage of the composite cable is that, due to the swedging operation, the strands of the flexible cable are compactly arranged so that a substantially solid section is formed. This compacting of the strands plus the material of the swedging-on sleeve, increases the effective modulus of elasticity and strength of the cable. According to present experimental data, the increase in modulus of elasticity is approximately two hundred (200%) percent, which definitely shows the superiority of the composite type of cable. Since, when plain steel cables are used, the general practice is to determine the cable size on the basis of stretch allowed, it is frequently possible to replace a large steel cable with a small composite cable at a considerable saving in weight.

The decrease in stretching characteristics obtained from the composite cable prevents the slacking of the return cable when the control is loaded, thus decreasing the whipping action. This is advantageous in that it allows the control cables to be placed closer together and thereby conserves space in the airplane.

A further advantage of the composite cable is that the increased stiffness and decrease stretching characteristics allow a considerable reduction in rigging tension, thereby reducing the friction in the control system and making for much smoother operation. Due to the smooth surface of the composite cable and its ability to operate under small angles of bend, it is possible to replace the present expensive pulleys and pulley brackets with fairleads of moderate cost.

Another advantage of the composite type of cable is that the aluminum covering protects the steel cable from rust and corrosion and thereby increases the life of the cable and safety of the airplane.

In order that the invention may be better understood, the following description is given, reference being made to the accompanying drawing, in which, Figure 1 is an arbitrary length of flexible cable and outer tube showing the relation of the cable to the tube prior to the swedging operation.

Figure 2 is a view along section II—II of Figure 1.

Figure 3 is an arbitrary length of the composite cable formed by swedging the tube over fill the grooves of the flexible cable.

Figure 4 is a view along section IV—IV of Figure 3.

Figure 5 shows an application of the composite type of cable to an aircraft control system.

In practice, the flexible cable 10 may be strung through the tube 11 of a material dissimilar to that of the cable 10 (Figures 1 and 2) after which the combination may be fed through a modern swedging machine which compresses the tube until it fills the spiral grooves 13 of the flexible cable 10 forming a composite cable 12 as shown in Figures 3 and 4. It is noted that the diameter of the composite cable 12 is considerably reduced due to the compacting of the strands of the flexible cable 10 and the forcing of the tube 11 to fill the grooves 13.

In order that those skilled in the art may better understand my invention and its application to aircraft, I have shown in Figure 5, the rear portion of a conventional airplane, cut away to show one of the many methods by which the control surfaces may be operated. However, it is to be distinctly understood that the method herein shown is for illustrative purposes only and that the invention is not to be limited to such applications.

Referring to Figure 5, the elevator 14 is operated by the link 15 from the bell crank 16, which in turn is operated by the composite control cables 12 and 12a. It is, of course, necessary to eliminate the tube 11 where the cable 10 passes over the pulley 17. However, it has been found that, if the change in direction is very gradual, the composite cable 12 will operate as satisfactorily as the plain flexible cable 10. This feature is better shown where the composite cable 12 passes through the guide or fairlead 18, and, in doing so, makes a small change in direction. Since aircraft control systems are well known to those skilled in the art, it is obvious that further explanation is unnecessary. Suffice it to say that, in order to obtain maximum efficiency, the composite cable 12 should extend forward through additional fairleads (where necessary) and attach to the control column or other aircraft controlling device. Due to the wear on the cables and the induced friction in the control system, the use of fairleads in this manner has heretofore been impractical, and it should be kept in mind that they could replace a great majority of the pulleys and pulley brackets now used.

In order that the expansive characteristics of the composite type of cable may be fully understood, it is seen, in the example shown in Figure 5, that the composite cables 12 and 12a are attached to the bellcrank 16 which is in turn attached to the structure 19. The forward ends of the cables 12 and 12a are also attached to the structure 19 by means of some other element (not shown). Thus, when changes of temperature are encountered, the structure 19 will expand or contract, and the positional relation of the bellcrank 16 with respect to the forward points of attachment of the cables 12 and 12a (not shown) will be changed. Since the composite control cables 12 and 12a have a coefficient of expansion approaching that of the structure 19, the contraction or expansion of the structure 19 will be accompanied by a corresponding change in the length of the cables 12 and 12a and thereby maintain a more uniform cable tension. It is the method of modifying cable by impacting thereon a sleeve of dissimilar material, and the application of the composite cable thus formed to aircraft, that constitutes my invention.

It is obvious that the flexible cable 10 may consist of any number of strands of wire depending on the strength and degree of flexibility desired. It is also obvious that the relative proportions between the cable 10 and the tube 11 may be varied to give a composite cable of the desired expansive characteristics.

While I have fully described the preferred embodiment of my invention and enumerated a few of its many advantages, it will be evident to those skilled in the art that many modifications and changes, both in materials and uses, can be made therein without departing from the spirit and scope of the appended claims.

I claim:

1. A composite tension member having modified coefficient of expansion characteristics comprising a normally flexible metal core, composed of a plurality of adjacent metal strands covered for a substantial portion of its length by a relatively rigid sleeve, said core and said sleeve having substantially different coefficients of expansion, and said core and said sleeve being sufficiently bonded together to form a composite structural unit having an effective linear coefficient of expansion intermediate those of said core and said sleeve.

2. A composite tension member having modified coefficient of expansion characteristics comprising a normally flexible metal core composed of a plurality of adjacent spirally arranged metal strands, said core being covered for a substantial portion of its length, by a relatively rigid sleeve formed into intimate conformation with the outside convolutions of the strands of said metal core whereby the longitudinal bond between said stranded metal core and said metal sleeve is such as to form a composite structural unit having an effective coefficient of linear expansion intermediate those of the said core and the said sleeve.

3. A composite tension member having modified coefficient of expansion characteristics comprising a normally flexible, metal core composed of a plurality of adjacent spirally arranged metal strands, said core being covered for a substantial portion of its length by a relatively rigid sleeve bonded into intimate conformation with the outside convolutions of the strands of said metal core whereby the longitudinal bond between said stranded metal core and said metal sleeve is such as to result in a composite structural unit having an effective linear coefficient of expansion intermediate those of the said core and the said sleeve.

4. A composite tension member having modified coefficient of expansion characteristics comprising a normally flexible, metal core composed of a plurality of adjacent spirally arranged metal strands, said core being covered for a substantial portion of its length by a relatively rigid sleeve swedged into intimate conformation with the outside convolutions of the strands of said metal core whereby the longitudinal bond between said stranded metal core and said metal sleeve is such as to result in a composite structural unit having an effective linear coefficient of expansion intermediate those of the said core and the said sleeve.

5. A composite tension member having modified coefficient of expansion characteristics comprising a normally flexible metal core composed of a plurality of spirally arranged bundles of adjacent metal strands covered for a substantial portion of its length by a relatively rigid sleeve, said core and said sleeve being sufficiently bonded together to form a composite structural unit having an effective linear coefficient of expansion intermediate those of said core and said sleeve.

6. A composite tension member having modified coefficient of expansion characteristics comprising a normally flexible metal core composed of a plurality of adjacent spirally arranged metal strands and a relatively rigid sleeve surrounding said core for a substantial portion of its length, said sleeve having a greater coefficient of expansion than said metal core and said sleeve and core being sufficiently bonded together to form a composite structural unit having an effective linear coefficient of expansion greater than that of said core alone.

7. A composite tension member having modified coefficient of expansion characteristics comprising a normally flexible metal core composed of a plurality of adjacent ferrous metal strands covered for a substantial portion of its length by a relatively rigid sleeve, said core and said sleeve being sufficiently bonded together to form a composite structural unit having an effective linear coefficient of expansion intermediate those of said core and said sleeve.

8. A composite tension member having modified coefficient of expansion characteristics comprising a normally flexible metal core composed of a plurality of adjacent metal strands covered for a substantial portion of its length by a relatively rigid aluminum-containing metal sleeve, said core and said sleeve being sufficiently bonded together to form a composite structural unit having an effective linear coefficient of expansion intermediate those of said core and said sleeve.

9. A composite tension member having modified coefficient of expansion characteristics comprising a normally flexible metal core composed of a plurality of adjacent ferrous metal strands covered for a substantial portion of its length by a relatively rigid aluminum-containing metal sleeve, said core and said sleeve being sufficiently bonded together to form a composite structural unit having an effective linear coefficient of expansion intermediate those of said core and said sleeve.

10. A composite tension member having modified coefficient of expansion characteristics comprising a normally flexible metal core composed of a plurality of adjacent metal strands covered for a substantial portion of its length by a relatively rigid sleeve, said sleeve having a cross-sectional area in the order of that of the said flexible metal core, and said core and said sleeve being sufficiently bonded together to form a composite structural unit having an effective linear coefficient of expansion intermediate those of said core and said sleeve and in which the ratio of the effective modulus of elasticity to weight of the composite structural unit is substantially increased.

11. In combination with an aircraft structure, apparatus comprising a control member, and means to actuate said control member comprising a normally flexible, metal core composed of a plurality of adjacent, spirally arranged metal strands, said core being covered for a substantial portion of its length by a relatively rigid sleeve swedged into intimate contact with the convolutions of the outside form of the strands of said core whereby the whole forms a relatively rigid control actuating means.

12. A composite tension member according to claim 6 in which the said core is composed of a ferrous alloy and the said sleeve is composed of an aluminum-containing metal.

13. In combination with an aircraft structure having a predetermined effective coefficient of expansion between control points, apparatus comprising a control member attached to said structure, and means to actuate said control member situated at a point in said structure remote from said control member, a normally flexible, stranded metal cable having a coefficient of expansion substantially different from that of said structure for transmitting motion through said structure from said actuating means to said control means and a relatively rigid sleeve surrounding and bonded into intimate contact with the convolutions of the outside form of said cable over a substantial portion of its length between the actuating means and control member, said sleeve having a coefficient of expansion substantially different from that of said cable and of such value that the effective longitudinal coefficient of expansion of the resultant composite motion transmitting means is modified to a value more nearly approximating that of said aircraft structure than that of the flexible core alone.

14. Apparatus according to claim 13 in combination with a pulley or the like means in said structure for changing the direction of said cable extending through said structure and in which the said rigid sleeve surrounding said cable is limited in length to a portion of the straight unbending sections on either side of said pulley or in the like direction changing means.

15. In an aircraft structure having a metal frame member, a control element mounted on said structure, a control cable for said control element extending along said metal frame member, said control cable, throughout the major portion thereof which extends along said frame member, comprising a twisted stranded metal core and a sleeve, of metal of substantially the same coefficient of expansion as that of said frame member, surrounding and swedged into intimate contact with said core whereby the coefficient of expansion of said cable approximates that of said frame member and tightening and slacking of said cable under temperature change is substantially obviated.

CARL F. BEED.